(12) United States Patent  (10) Patent No.: US 9,377,109 B2
Tsutsumi et al.  (45) Date of Patent: Jun. 28, 2016

(54) SEAL STRUCTURE OF ROTARY MACHINE AND GAS TURBINE EQUIPPED WITH SAME

(75) Inventors: Eiichi Tsutsumi, Tokyo (JP); Kenichi Arase, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 930 days.

(21) Appl. No.: 13/601,517

(22) Filed: Aug. 31, 2012

(65) Prior Publication Data

US 2015/0218958 A1   Aug. 6, 2015

(30) Foreign Application Priority Data

Jan. 12, 2012 (JP) .................................. 2012-004079

(51) Int. Cl.
*F16J 15/34* (2006.01)
*F01D 11/00* (2006.01)
*F01D 25/24* (2006.01)

(52) U.S. Cl.
CPC ............ *F16J 15/3452* (2013.01); *F01D 11/003* (2013.01); *F01D 11/005* (2013.01); *F01D 25/246* (2013.01); *F05D 2260/38* (2013.01)

(58) Field of Classification Search
CPC ..... F16J 15/34; F16J 15/3436; F16J 15/3452; F01D 11/003
See application file for complete search history.

(56) References Cited

U.S. PATENT DOCUMENTS 2,867,458 A * 1/1959 Kroekel ........................ 277/543
4,576,548 A    3/1986 Smed et al.
5,301,957 A * 4/1994 Hwang et al. ................. 277/350
5,370,403 A * 12/1994 Sedy ............................ 277/390
6,145,840 A * 11/2000 Pope ............................ 277/348
6,676,369 B2 * 1/2004 Brauer et al. ................. 415/113
2003/0184022 A1  10/2003 Brauer et al.
2004/0007823 A1 * 1/2004 Brauer et al. ................. 277/421

(Continued)

FOREIGN PATENT DOCUMENTS

EP  0571791 A1  12/1993
EP  1348898 A1  10/2003

(Continued)

OTHER PUBLICATIONS

Office Action dated Dec. 3, 2014, issued in corresponding Chinese Patent Application No. 201280057479.1, with English translation (14 pages).

(Continued)

*Primary Examiner* — Kristina Fulton
*Assistant Examiner* — Nicholas L Foster
(74) *Attorney, Agent, or Firm* — Westerman, Hattori, Daniels & Adrian, LLP (57) ABSTRACT

A seal structure of a rotary machine is such that: an outer circumference side member has a ring-shaped flange which projects radially inward and extends about the axis; an inner circumference side member has a flange which is of a ring shape projecting radially outward and extending about the axis, and which is opposite to the flange of the outer circumference side member from the axial direction; in either flange, there is formed a ring-shaped groove part which is recessed from the end surface facing the other flange; in the groove part, a ring-shaped seal body advances and retracts to come in contact with the other flange; and there is a first biasing device biasing body toward the other flange side, and a second biasing device biasing it toward the wall surface of the groove part.

5 Claims, 6 Drawing Sheets

(56) References Cited

U.S. PATENT DOCUMENTS

2011/0049809 A1   3/2011  Garrison
2015/0167846 A1*  6/2015  Haynes et al. ................ 277/350

FOREIGN PATENT DOCUMENTS

| JP | 60-159306 A | 8/1985 |
| JP | 2002-161712 A | 6/2002 |
| JP | 2004-316509 A | 11/2004 |

OTHER PUBLICATIONS

Extended European Search Report dated Dec. 11, 2014, issued in corresponding European Patent Application No. 12865076.9 (7 pages).
International Search Report of PCT/JP2012/072157, mailing date of Nov. 13, 2012 with English translation.
Written Opinion dated Nov. 13, 2012, issued in corresponding International Application No. PCT/JP2012/072157, with English translation.

* cited by examiner

SEAL STRUCTURE OF ROTARY MACHINE AND GAS TURBINE EQUIPPED WITH SAME

BACKGROUND OF THE INVENTION

1. Field of the Invention

The present invention relates to a seal structure of a rotary machine and a gas turbine equipped with the same.

Priority is claimed on Japanese Patent Application No. 2012-004079, filed Jan. 12, 2012, the contents of which are incorporated herein by reference.

2. Description of Related Art

Heretofore, there has been known a rotary machine such as a gas turbine, which has a casing and a rotating body which is rotated about the rotational axis in the interior of the casing. The casing of the gas turbine is provided with a casing (outer circumference side member), and a blade ring (inner circumference side member) which is arranged on the inner side of the casing in the radial direction that is orthogonal to the turbine shaft (hereunder, referred to as shaft).

In the gas turbine, depending on the intended purpose of cooling air, the space between the casing and the blade ring is separated in the axial direction by a ring-shaped seal body, forming a cavity.

As a seal structure of this type of a gas turbine, Patent Document 1 below discloses a seal structure in which a ring-shaped flange which is formed on an outer casing (outer circumference side member) and which projects radially inward and extends about the axis, and a ring-shaped flange which is formed on an inner casing (inner circumference side member) and which projects radially outward and extends about the axis, are arranged so as to be opposite to each other in the axial direction, and a seal body intervenes between these flanges.

In either one of these flanges, there is formed a ring-shaped groove part, which is recessed from the end surface that faces the other flange side and which extends about the axis, and the seal body is accommodated in this groove part so as to advance and retract while being able to come in contact with the other flange.

Moreover, there has been known a structure such as one disclosed in Patent Document 2 in which the circumferential surface of the seal body facing in the radial direction comes in contact with a shroud (outer circumference side member) to thereby provide sealing.

PRIOR ART DOCUMENTS

Patent Documents

[Patent Document 1] Japanese Unexamined Patent Application, First Publication No. 2002-161712

[Patent Document 2] Japanese Unexamined Patent Application, First Publication No. S60-159306

SUMMARY OF THE INVENTION

Problems to be Solved by the Invention

However, the conventional seal structure of a rotary machine and the gas turbine using the same described above have the following problem.

That is to say, in the case of the structure, as with the one disclosed in Patent Document 2, where the circumferential surface of the seal body facing in the radial direction is used to provide sealing, sealing is provided by the curved surfaces being in contact with each other. Therefore, there is a possibility that the level of sealing performance may be reduced due to thermal expansion and so forth at the time of operation.

On the other hand, according to the structure, as with the structure disclosed in Patent Document 1, in which the end surface of the seal body facing in the axial direction is used to provide sealing, sealing can be provided by the flat surfaces being in contact with each other. Therefore, it is likely to be free of influence of thermal expansion and so forth at the time of operation, and stable sealing performance is ensured. However, in this case, there is a possibility that gas (fluid) may infiltrate between the circumference of the seal body facing in the radial direction and the wall surface of the groove part facing in the radial direction, so that there is still room for improving the level of sealing performance.

The present invention takes into consideration the above circumstances, with an object of providing a seal structure of a rotary machine capable of stably increasing sealing performance, and a gas turbine which uses the same.

Means for Solving the Problem

In order to achieve the object above, the present invention proposes the following measures.

That is to say, the present invention is a seal structure of a rotary machine, which has a casing and a rotating body which is rotated about an axis in the interior of the casing, the casing comprising an outer circumference side member, and an inner circumference side member which is arranged on the inner side of the outer circumference side member in the radial direction that is orthogonal to the axis, wherein the outer circumference side member has a ring-shaped flange which projects inward in the radial direction and which extends about the axis, the inner circumference side member is of a ring shape which projects outward in the radial direction and which extends about the axis, and it has a flange which is opposite in the axial direction to the flange of the outer circumference side member, on either one of the flange of the outer circumference side member and the flange of the inner circumference side member, there is formed a ring-shaped groove part which is recessed from an end surface facing the other flange side and which extends about the axis, the groove part accommodates a ring-shaped seal body which advances and retracts so as to be able to come in contact with the other flange, and there are provided a first biasing device which biases the seal body toward the other flange side, and a second biasing device which biases the seal body toward a wall surface of the groove part facing in the radial direction.

Moreover, the gas turbine of the present invention uses the seal structure of a rotary machine described above.

According to the seal structure of a rotary machine of the present invention and the gas turbine using the same, the seal body, which is arranged in the groove part of one of the pair of flanges axially opposing to each other in the outer circumference side member and the inner circumference side member, comes in contact with the other flange from the end surface facing in the axial direction, to thereby perform sealing. That is to say, sealing can be performed by the flat surfaces of the seal body and the flange being in contact with each other, and therefore, it is likely to be free of influence of thermal expansion and so forth at the time of operation, and stable sealing performance is ensured.

In the gas turbine which uses this seal structure, the outer circumference side member is, for example, a casing, and the inner circumference side member is, for example, a blade ring or an exhaust diffuser.

Since this seal structure is provided with the first biasing device which biases the seal body toward the other flange side, even in the case where the distance between the pair of flanges increases or decreases due to thermal expansion, the seal body is prevented from moving away from the other flange so that contact between them is maintained stably.

Furthermore, the seal structure of a rotary machine of the present invention is provided with the second biasing device which biases the seal body toward the wall surface of the groove part facing in the radial direction, and therefore, it exhibits the following effect.

That is to say, the orientation of the above-mentioned first biasing device biasing the seal body is the direction of the seal body to move away from the bottom surface of the groove part (the surface of the groove part that faces the other flange side), and therefore, a gap is likely to occur between the seal body and the bottom surface of the groove part. In the state where this type of gap is present, if a gap further occurs also in between the wall surface of the groove part facing in the radial direction and the seal body, the entire inner surface of the groove part and the seal body are separated from each other, and there is a possibility that gas (fluid) may enter through this gap and sealing performance may not be ensured.

Consequently, as practiced in the present invention, the second biasing device biases the seal body toward the radial direction to thereby ensure sealing performance between the seal body and the wall surface of the groove part. As a result, infiltration of gas is prevented, and the level of sealing performance is stably increased, combined with the effect mentioned above.

Moreover, in the seal structure of a rotary machine of the present invention, the seal body may include a plurality of segments arranged about the axis, and the first biasing device and the second biasing device may be provided respectively on these segments.

In this case, since the seal body includes a plurality of segments arranged about the axis, these segments tolerate relative movements of the outer circumference side member and the inner circumference side member in the axial direction or in the radial direction due to thermal expansion differential therebetween and pressure deformation, while gas leakage in the seal structure can be prevented.

Since the effect mentioned above can be obtained for each of these segments, even if thermal expansion differential due to temperature difference occurs in each portion along and about the axis of the seal body, the level of sealing performance can be stably increased.

Moreover, in the seal structure of a rotary machine of the present invention, the second biasing device may bias the seal body outward in the radial direction.

According to the present invention, even in the case where the seal body thermally expands, the biasing force of the second biasing device is likely to stably maintain the seal body being continuously in contact with the wall surface of the groove part. Therefore, the above effect can be stably obtained.

Effect of the Invention

According to the seal structure of a rotary machine and the gas turbine which uses the same of the present invention, the level of sealing performance can be stably increased.

DETAILED DESCRIPTION OF THE INVENTION

Hereunder, an embodiment of the present invention is described, with reference to the drawings.

A gas turbine according to the embodiment of the present invention includes a compressor, a combustor, and a turbine. The gas turbine is configured so as to mix compressed air produced in the compressor with fuel and combust it in the combustor to produce high-temperature and high-pressure combustion gas. This combustion gas flows into the turbine, and thereby rotates the rotor of the turbine about the turbine shaft (shaft) to obtain rotational power.

In the present specification, the compressor side of the combustor along the axial direction is referred to as the upstream side, and the turbine side of the combustor is referred to as the downstream side. Moreover, the direction orthogonal to the axial direction is referred to as the radial direction, and the direction of revolution about the axis is referred to as about the axis (or circumferential direction).

This gas turbine has a casing 30 and a rotating body such as the rotor which rotates about the axis in the interior of the casing 30, and the seal structure of a rotary machine according to the present embodiment is used for this gas turbine (rotary machine).

Figure 1:
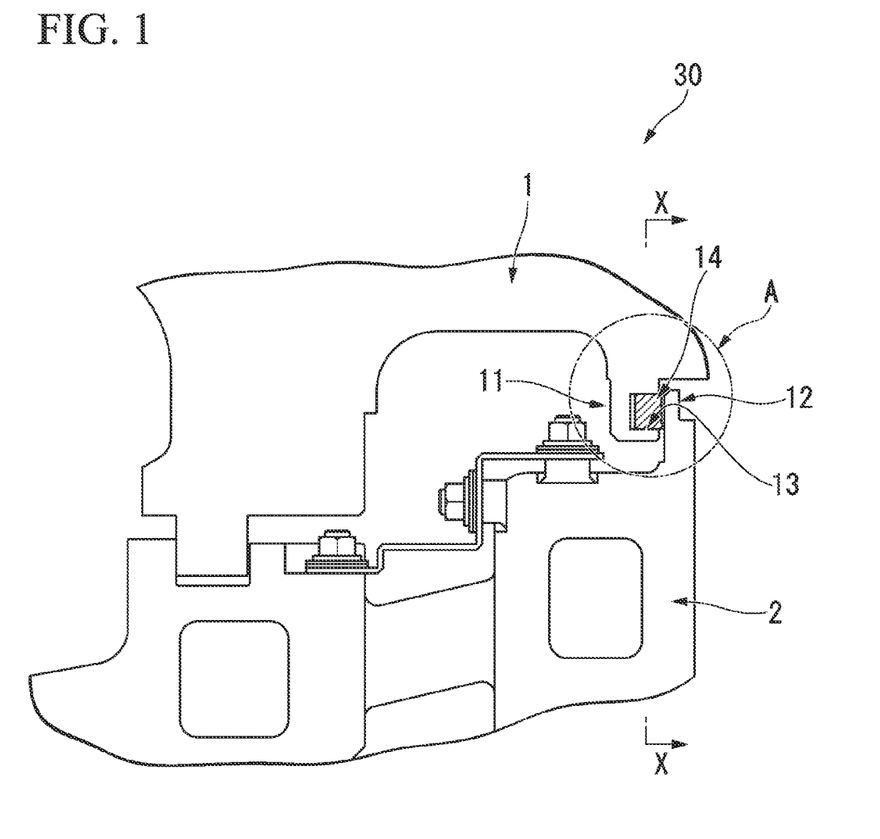
FIG. 1 is a longitudinal sectional view showing the vicinity of a seal structure of a gas turbine according to an embodiment of the present invention.

As shown in FIG. 1, the casing 30 is provided with a cylindrical outer circumference side member 1, and a cylindrical inner circumference side member 2 which is arranged on the radially inner side (lower side in FIG. 1) of the outer circumference side member 1.

In the example shown in the figure, a casing is shown as the outer circumference side member 1 and a blade ring is shown as the inner circumference side member 2. These casing and blade ring are, for example, divided into two in the circumferential direction and form a ring shape (cylinder shape) as a whole by being combined in the perpendicular direction (up-down direction). An exhaust diffuser may be used as the inner circumference side member 2 instead of the blade ring.

The outer circumference side member 1 has a ring-shaped flange 11 which projects inward in the radial direction and which extends about the axis. Moreover, the inner circumference side member 2 is formed in a ring shape so as to project outward in the radial direction and extends about the axis. Furthermore, the inner circumference side member 2 has a flange 12 which is opposite to the flange 11 of the outer circumference side member 1 in the axial direction (left-right direction in FIG. 1).

In the example shown in the figure, the flange 12 of the inner circumference side member 2 is arranged so as to be opposite to the flange 11 of the outer circumference side member 1 from the axially downstream side (the right hand side in FIG. 1). Moreover, between these flanges 11 and 12, there is formed a small gap in the axial direction.

In either one of the flange 11 of the outer circumference side member 1 and the flange 12 of the inner circumference side member 2, there is formed a ring-shaped groove part 13 which is recessed from the end surface facing the other flange side and which extends about the axis, and in this groove part 13, there is accommodated a ring-shaped seal body 14 which advances and retracts while being able to come in contact with the other flange.

In the example shown in the figure, the groove part 13 is formed in the end surface of the flange 11 of the outer circumference side member 1 which faces the flange 12 side of the inner circumference side member 2 (that is, the axially downstream side), and in this groove part 13, there is accommodated the seal body 14, which advances and retracts toward and from the flange 12 of the inner circumference side member 2 while being able to come in contact therewith.

Figure 3:
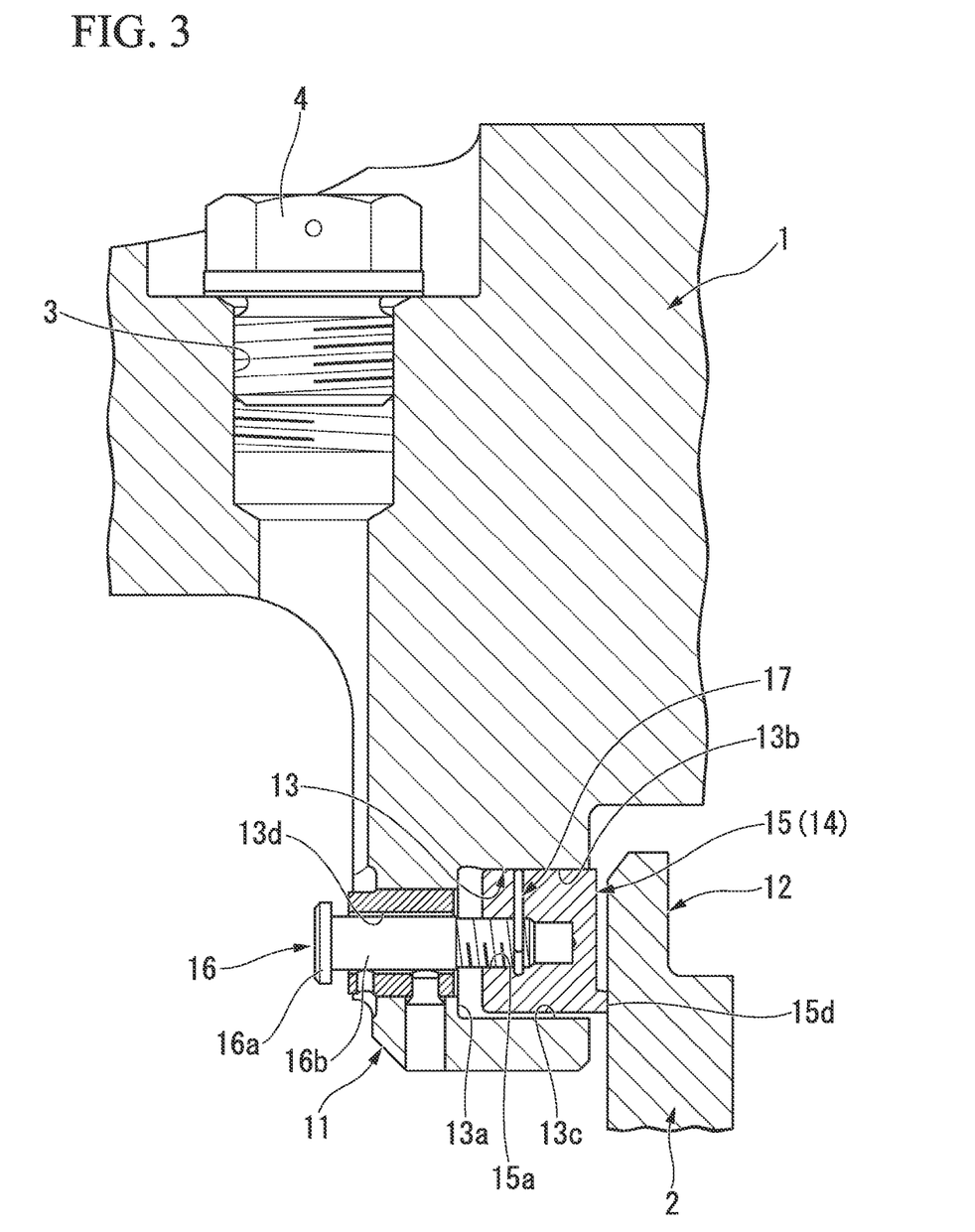
FIG. 3 is an enlarged view of the A part of FIG. 1.

As shown in FIG. 3, the groove part 13 has a bottom surface 13a facing in the axial direction, and a pair of wall surfaces 13b and 13c facing in the radial direction. The bottom surface 13a faces the axially downstream side (the right hand side in FIG. 3), and it is formed in a flat surface shape perpendicular to the axis. Moreover, among the wall surfaces 13b and 13c, the wall surface 13b which is arranged on the radially outer side of the groove part 13 and which faces the radially inner side, is formed in a recessed and curved surface which is parallel with the axis and extends along the circumferential direction. The wall surface 13c which is arranged on the radially inner side of the groove part 13 and which faces the radially outer side, is formed in a protruded and curved surface which is parallel with the axis and extends along the circumferential direction.

Moreover, in the bottom surface 13a of the groove part 13, there are formed, at intervals along the circumferential direction, a plurality of through holes 13d which respectively open in the surface facing the axially upstream side of the flange 11 (the left hand side in FIG. 3). These through holes 13d are respectively arranged in positions corresponding to a pin installation hole 15a of the seal body 14 to be described later.

In the longitudinal sectional view shown in FIG. 3 (the cross-sectional view including the axis), in the groove part 13, there is formed a rectangular hole which opens toward the axially downstream side.

Moreover, on the circumferential wall of the outer circumference side member 1, at positions corresponding to the radially outer side of the respective through holes 13d, there are respectively formed screw holes 3 which pass through the circumferential wall in the radial direction. The inner diameter of the screw hole 3 is a diameter which allows insertion of a temporary joint member 5 described later. In the screw hole 3, a screw member 4 is threadably fitted so as to be attachable and detachable to and from the screw hole 3.

Moreover, in the longitudinal sectional view shown in FIG. 3, the seal body 14 is of a rectangular shape, and it can be accommodated in the groove part 13. Specifically, the length (thickness) of the seal body 14 along the axial direction is shorter than or equal to the length (groove depth) of the groove part 13 along the axial direction. Furthermore, the length (width) of the seal body 14 along the radial direction is shorter than the length (groove width) of the groove part 13 along the radial direction.

The seal body 14 comprises a plurality of segments 15 arranged about the axis.

Figure 2:
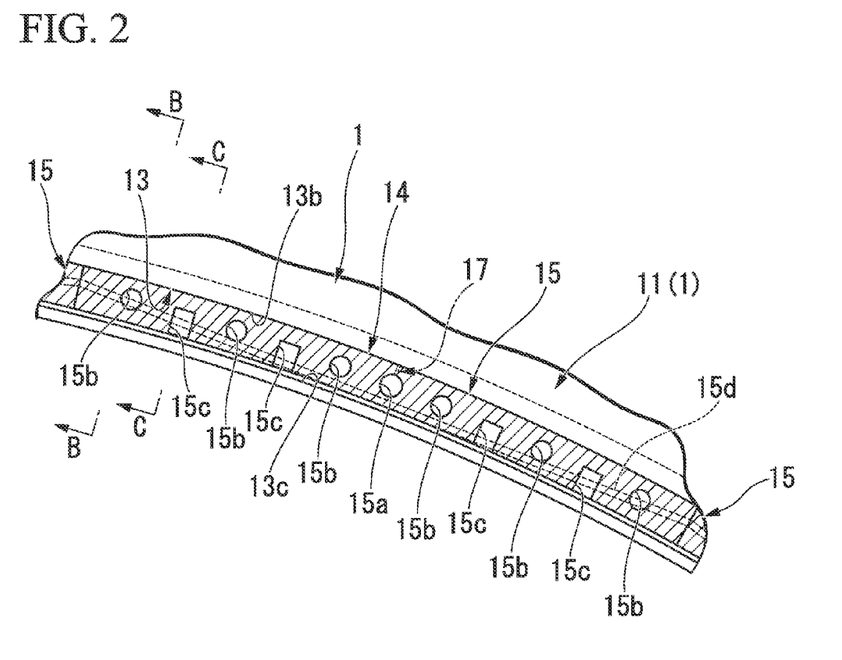
FIG. 2 is a frontal sectional view (X-X sectional view of FIG. 1) of the flange of the outer circumference side member being cut at the axially middle portion (the portion between both end parts of the flange along the turbine axial direction), and it is a diagram for describing segments of the seal body.

In the frontal sectional view shown in FIG. 2 (lateral sectional view, the section perpendicular to the axis), the segment 15 is of an arc shape, and by having the segments 15 adjacent to each other in the circumferential direction arranged in a manner such that the end surfaces thereof facing in the circumferential direction come in close proximity to each other, the seal body 14 forms a ring shape as a whole. Between the segments 15 adjacent to each other in the circumferential direction, there is preferably provided a small gap, taking into consideration thermal expansion at the time of operation.

Although not shown in particular in the figure, in the present embodiment, twenty four units of segment 15 are arranged at even intervals in the circumferential direction.

As shown in FIG. 2 and FIG. 3, in the segment 15 of the seal body 14, in the end surface facing the bottom surface 13a side of the groove part 13, there is formed the pin installation hole 15a which opens to the end surface and which extends toward the axially downstream side. The pin installation hole 15a is not opened to the end surface of the segment 15 (the end surface that faces the axially downstream side, that is, the surface opposite to the flange 12) that faces the opposite side of the bottom surface 13a of the groove part 13.

In the following description, the end surface of the seal body 14 that faces the opposite side of the bottom surface 13a of the groove part 13 is referred to simply as the seal surface.

In FIG. 2, the pin installation hole 15a is arranged in the center part along the circumferential direction of the segment 15. Moreover, as shown in FIG. 3, the pin installation hole 15a is female-threaded, and a male-threaded pin member 16 is threadably fitted therein. Reference symbol 17 in FIG. 3 denotes a detent part of the pin member 16. Moreover, in FIG. 2, the pin member 16 arranged in the pin installation hole 15a, a first biasing device 21 arranged within a first accommodating hole 15b described later, and a second biasing device 22 arranged within a second accommodating hole 15c are not shown.

In FIG. 3, the pin member 16 is inserted into the through hole 13d of the flange 11 of the outer circumference side member 1 from the axially upstream side, and it extends toward the downstream side. The outer diameter of the head part 16a of the pin member 16 is greater than the inner diameter of the through hole 13d, and moreover, the outer diameter of the shank 16b of the pin member 16 is smaller than the inner diameter of the through hole 13d.

Figure 4:
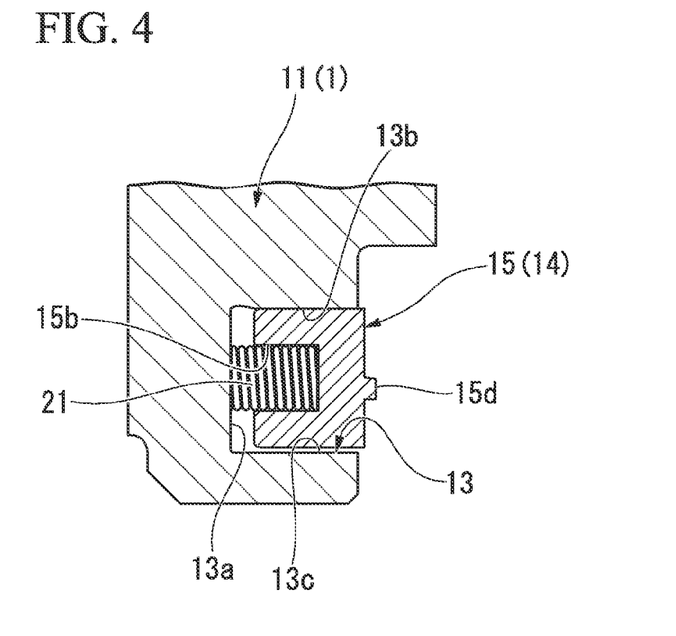
FIG. 4 is a B-B sectional view of FIG. 2.

As shown in FIG. 2 and FIG. 4, in the segment 15 of the seal body 14, a plurality of first accommodating holes 15b is formed at intervals in the end surface facing the bottom surface 13a side of the groove part 13 along the circumferential direction.

As shown in FIG. 4, the first accommodating hole 15b opens toward the bottom surface 13a side of the groove part 13 in the segment 15, and it extends toward the seal surface (the surface facing the right hand side in FIG. 4) side. However, it is not opened to the seal surface.

Furthermore, as shown in FIG. 2, in the segment 15 of the seal body 14, a plurality of second accommodating holes 15c is formed at intervals in the inner circumferential surface facing the wall surface 13c side of the groove part 13 along the circumferential direction. In the example shown in the figure, the first accommodating hole 15b and the second accommodating hole 15c are arranged in the segment 15 alternately along the circumferential direction.

Figure 5:
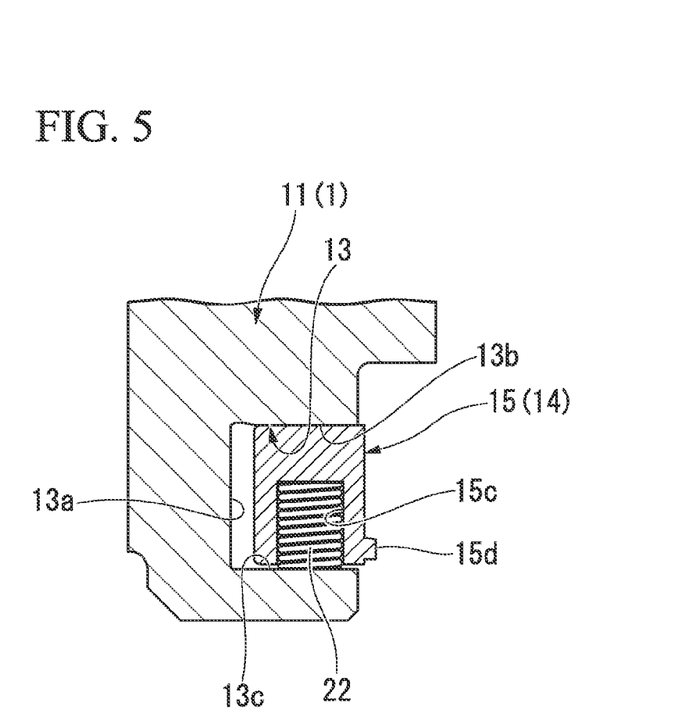
FIG. 5 is a C-C sectional view of FIG. 2.

As shown in FIG. 5, the second accommodating hole 15c opens toward the wall surface 13c side of the groove part 13 in the segment 15, and it extends toward the wall surface 13b side (the upper side in FIG. 5). However, it is not opened to the outer circumferential surface that faces the wall surface 13b side.

Moreover, in FIG. 2 through FIG. 5, on the seal surface of the segment 15 of the seal body 14, there is formed a rib 15d which projects from the seal surface and which extends in the circumferential direction. The flat tip end surface of the rib 15d (the surface facing the axially downstream side) comes in contact with the flange 12.

In the frontal sectional view shown in FIG. 2, the rib 15d extends so that the position thereof in the radial direction gradually changes from one end to the other end in the circumferential direction in the segment 15. In the example shown in the figure, the rib 15d is of a linear shape. The radial position of the rib 15d is arranged on the radially outermost side at both end parts in the circumferential direction, and is arranged on the radially innermost side at the middle part in the circumferential direction in the segment 15.

As shown in FIG. 4 and FIG. 5, this seal structure is provided with the first biasing device 21, which biases the seal body 14 toward the flange 12, and the second biasing device 22, which biases it toward either one of the wall surfaces 13b and 13c of the groove part 13 facing in the radial direction.

The first biasing device 21 and the second biasing device 22 are formed with an elastic member, and in the example shown in the figure, a compression coil spring is used therefor.

The first biasing device 21 and the second biasing device 22 are respectively provided for the plurality of segments 15.

The first biasing device 21 is accommodated in the first accommodating hole 15b of the segment 15. Moreover, the second biasing device 22 is accommodated in the second accommodating hole 15c of the segment 15.

In FIG. 4, the first biasing device 21 expandably and contractably extends in the axial direction, and both end parts thereof are in contact with the bottom surface 13a of the groove part 13 and the bottom surface of the first accommodating hole 15b (the bottom surface facing the axially upstream side).

In FIG. 5, the second biasing device 22 expandably and contractably extends in the radial direction, and both end parts thereof are in contact with the wall surface 13c of the groove part 13 and the bottom surface of the second accommodating hole 15c (the bottom surface facing the radially inner side). In the present embodiment, the second biasing device 22 biases the seal body 14 toward the radially outer side (that is to say, toward the wall surface 13b of the groove part 13).

Figure 6A:
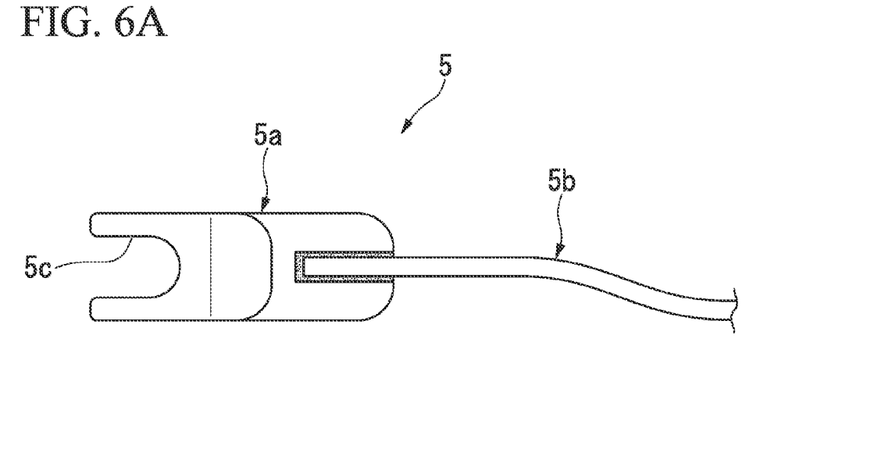
FIG. 6A is a front view of a temporary joint member used for assembling the seal structure.
Figure 6B:
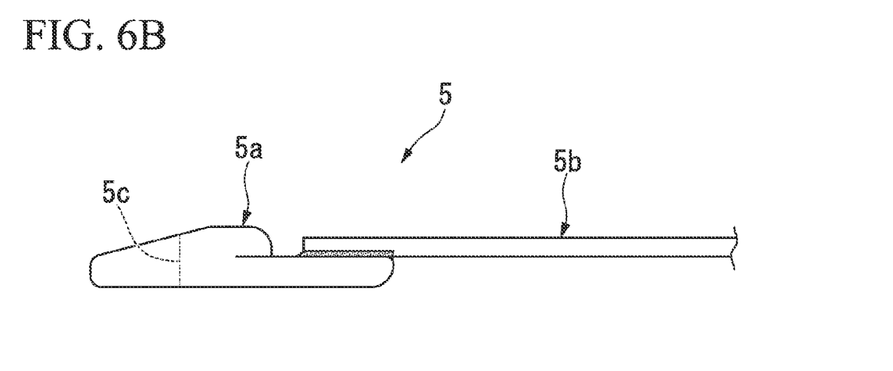
FIG. 6B is a side view of the temporary joint member used for assembling the seal structure.

Moreover, shown in FIG. 6A and FIG. 6B is a temporary joint member 5 used in the assembly of the seal structure of the present embodiment. The temporary joint member 5 is provided with an engaging part 5a which engages with the pin member 16, and a cord part 5b which is connected to the engaging part 5a.

In the front view shown in FIG. 6A, in the tip end part of the engaging part 5a, there is formed a U-shaped cutaway part 5c, and the opening width of the cutaway part 5c is greater than the shank 16b of the pin member 16 and smaller than the head part 16a. Moreover, in the side view shown in FIG. 6B, the tip end part of the engaging part 5a is formed in a tapered shape so that it successively becomes tapered with approach to the tip end side.

Furthermore, the cord part 5b is formed of a metal wire or the like with flexibility, and in the example shown in the figure, it is connected to the end part opposite to the tip end part of the engaging part 5a by means of brazing.

Next, assembly of the seal structure mentioned above is described.

Figure 7:
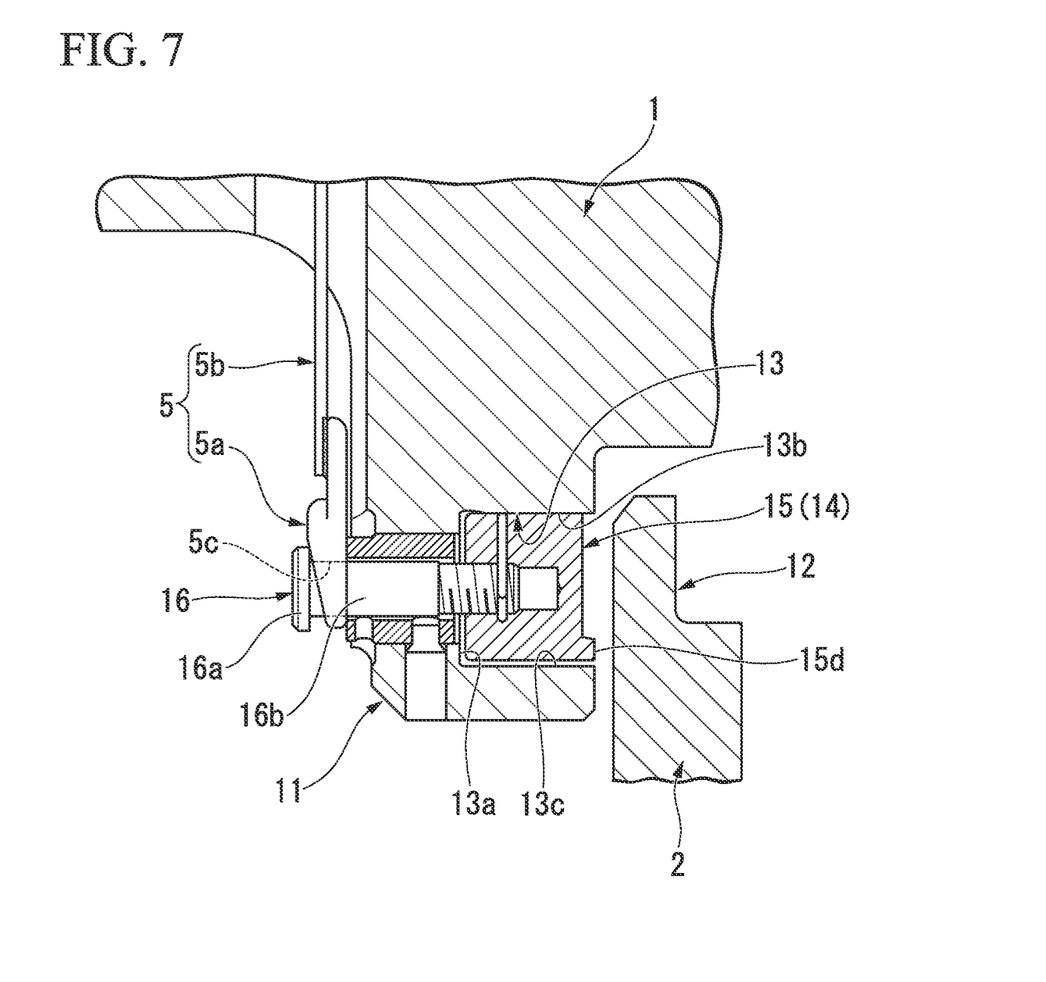
FIG. 7 is a diagram for describing the assembly of the seal structure.

As shown in FIG. 7, preliminarily, the temporary joint member 5 is engaged with the pin member 16 of each segment 15 of the seal body 14.

Specifically, in the state where the screw member 4 has been removed from the screw hole 3 of the outer circumference side member 1, the temporary joint member 5 is inserted into the screw hole 3. While the shank 16b of the pin member 16 is being accommodated in the tip end part (the cutaway part 5c) of the engaging part 5a of the temporary joint member 5, the tip end part is inserted in between the end surface of the flange 11 facing the axially upstream side (the left hand side in FIG. 7) and the head part 16a of the pin member 16, against the biasing force of the first biasing device 21.

As a result, the segment 15 of the seal body 14 is drawn into the groove part 13, the seal surface of the segment 15 (specifically, the tip end surface of the rib 15d of the seal surface) is arranged so that it becomes flush with the end surface of the flange 11 facing the axially downstream side (the right hand side in FIG. 7), or it retracts to the axially upstream side from the end surface.

From this state, the outer circumference side member 1 and the inner circumference side member 2 are moved to approach to each other in the radial direction, and thereby the flanges 11 and 12 are respectively arranged so as to be opposite to each other in the axial direction.

At this time, the seal body 14 is flush with the end surface of the flange 11 facing the axially downstream side or it has retracted from the end surface, and therefore, the radially outer side end part of the flange 12 is prevented from coming into contact with and consequently damaging the seal body 14.

When the outer circumference side member 1 and the inner circumference side member 2 have been relatively positioned, the cord part 5b of the temporary joint member 5 is pulled through the screw hole 3 from the outer side of the outer circumference side member 1, to thereby release the engagement between the engaging part 5a and the pin member 16.

At this time, since the tip end part of the engaging part 5a is of a tapered shape, when the temporary joint member 5 is pulled out, the biasing force of the first biasing device 21 moves the pin member 16 gradually toward the axially downstream side. As a result, deformation and breakage caused by impact of the seal surface of the seal body 14 contacting the flange 12 with great force can be prevented, and sealing performance can be ensured at a high level of precision.

Having been released from the engagement with the pin member 16, the temporary joint member 5 is taken out from the screw hole 3 to the outside of the outer circumference side member 1, and the screw member 4 is threaded into the screw hole 3 to seal it.

Even in the case where the seal body 14 cannot be viewed during the assembling process, as described in the present embodiment, the seal structure can be reliably assembled at a high level of precision according to this seal structure assembling method.

According to the seal structure of the present embodiment and the gas turbine using the same described above, the seal body 14, which is arranged in the groove part 13 of the flange 11 being one of the pair of flanges 11 and 12 axially opposing to each other in the outer circumference side member 1 and the inner circumference side member 2, comes in contact with the other flange 12 from the end surface (seal surface) facing in the axial direction, to thereby perform sealing. That is to say, sealing can be performed by the flat surfaces of the seal body 14 and the flange 12 being in contact with each other, and therefore, it is likely to be free of influence of thermal expansion and so forth at the time of operation, and stable sealing performance is ensured.

Since this seal structure is provided with the first biasing device 21 which biases the seal body 14 toward the other flange 12 side, even in the case where the distance between the pair of flanges 11 and 12 increases or decreases due to thermal expansion, the seal body 14 is prevented from moving away from the other flange 12 so that contact between them is maintained stably.

Furthermore, in the present embodiment, since there is provided the second biasing device 22, which biases the seal body 14 toward either one of the wall surfaces 13b and 13c of the groove part 13 facing in the radial direction, the following effect can be achieved.

That is to say, the orientation of the above first biasing device 21 biasing the seal body 14 is a direction of moving the seal body 14 away from the bottom surface 13a of the groove part 13, and therefore, a gap is likely to occur between the seal body 14 and the bottom surface 13a of the groove part 13. In the state where this type of gap is present, if a gap further occurs also in between the wall surfaces 13b and 13c of the groove part 13 facing in the radial direction and the seal body 14, the entire inner surface of the groove part 13 and the seal body 14 are separated from each other, and there is a possibility that gas may enter through this gap and sealing performance may not be ensured.

Consequently, as practiced in the present embodiment, the second biasing device 22 biases the seal body 14 toward either one side in the radial direction to thereby ensure sealing performance between the seal body 14 and the wall surface 13b or the wall surface 13c of the groove part 13. As a result, entering of gas is prevented, and the level of sealing performance is stably increased, combined with the effect mentioned above.

Specifically, in the present embodiment, the second biasing device 22 biases the seal body 14 toward the radially outer side (that is to say, toward the wall surface 13b of the groove part 13), and therefore, the following effect is achieved.

That is to say, according to this configuration, even in the case where the seal body 14 thermally expands, the biasing force of the second biasing device 22 is likely to stably maintain the seal body 14 being continuously in contact with the wall surface 13b of the groove part 13. Therefore, the above effect can be stably obtained.

Moreover, since the seal body 14 includes a plurality of segments 15 arranged about the axis, these segments 15 tolerate relative movements of the outer circumference side member 1 and the inner circumference side member 2 in the axial direction or in the radial direction due to thermal expansion differential therebetween and pressure deformation, while gas leakage in the seal structure can be prevented.

Since the effect mentioned above can be obtained for each of these segments 15, even if thermal expansion due to temperature difference occurs in each portion along and about the axis of the seal body 14, the level of sealing performance can be stably increased.

The present invention is not limited to the above embodiment, and various types of modifications may be made thereto without departing from the scope of the invention.

For example, in the above embodiment, a casing serving as an outer circumference side member 1 and a blade ring or an exhaust diffuser serving as an inner circumference side member 2 are used in the description. However, it is not limited to this. That is to say, as long as the outer circumference side member 1 and the inner circumference side member 2 are of a double ring-shaped body or a double cylinder-shaped body in which sealing performance in the axial direction is required with respect to the ring-shaped space or the cylindrical space formed therebetween, the present invention may be employed for portions other than those mentioned above.

Moreover, in the present embodiment, a gas turbine serving as a rotary machine is used in the description. However, this may be a rotary machine other than a gas turbine.

Furthermore, in the embodiment above, the groove part 13 is formed in the end surface of the flange 11 of the outer circumference side member 1 which faces the flange 12 side of the inner circumference side member 2, and in this groove part 13, there is accommodated the seal 14, which advances and retracts toward and from the flange 12 of the inner circumference side member 2 while being able to come in contact therewith. However, it is not limited to thereto. That is to say, the groove part 13 may be formed in the end surface of the flange 12 of the inner circumference side member 2 that faces the flange 11 side of the outer circumference side member 1, and in this groove part 13, there may be accommodated the seal body 14 which advances and retracts toward and from the flange 11 of the outer circumference side member 1 while being able to come in contact therewith.

Moreover, in the above embodiment, the flange 12 of the inner circumference side member 2 is arranged so as to be opposite to the flange 11 of the outer circumference side member 1 from the axially downstream side. However, inversely, the flange 11 of the outer circumference side member 1 may be arranged so as to be opposite to the flange 12 of the inner circumference side member 2 from the axially downstream side.

In addition, components described in the embodiment and the modified example (the supplemental description, etc) above of the present invention may be appropriately combined. Moreover, the above components may be substituted by commonly known components, without departing from the scope of the invention.

DESCRIPTION OF REFERENCE SYMBOLS

1 Outer circumference side member
2 Inner circumference side member
11 Flange (one flange)
12 Flange (the other flange)
13 Groove part
13b, 13c Wall surface
14 Seal body
15 Segment
21 First biasing device
22 Second biasing device
30 Casing

What is claimed is:
1. A seal structure of a rotary machine, comprising:
a casing; and
a rotating body which is rotated about an axis in an interior of said casing, wherein said casing comprises:
an outer circumference side member; and
an inner circumference side member which is arranged on an inner side of said outer circumference side member in a radial direction that is orthogonal to said axis,
wherein said outer circumference side member has a ring-shaped flange which projects inward in said radial direction and which extends about the axis,
wherein said inner circumference side member is formed in a ring shape which projects outward in said radial direction and which extends about the axis, and it has a flange which is opposite to the flange of said outer circumference side member in the axial direction, wherein on either one of the flange of said outer circumference side member or the flange of said inner circumference side member, there is formed a ring-shaped groove part which is recessed from an end surface facing the other of the flanges which does not have the groove part and which extends about the axis, wherein said groove part accommodates a ring-shaped seal body which advances and retracts so as to be able to come in contact with said other of the flanges which does not have the groove part, wherein there are provided a plurality of first biasing devices which bias said seal body toward said other of the flanges which does not have the groove part, and a plurality of second biasing devices which bias said seal body toward a wall surface of said groove part facing in said radial direction, wherein said plurality of first biasing devices are arranged only at respective first positions in a circumferential direction of the seal body, wherein said plurality of second biasing devices are arranged only at respective second positions which are different positions in the circumferential direction of the seal body from the first positions and adjacent to the respective first positions in the circumferential direction of the seal body, and wherein at least one of said second biasing devices is arranged between adjacent first biasing devices in the circumferential direction of the seal body.

2. A seal structure of a rotary machine according to claim 1, wherein:
said seal body comprises a plurality of segments arranged about the axis; and
said first biasing devices and said second biasing devices are respectively provided in these segments.

3. A seal structure of a rotary machine according to claim 1, wherein:
said second biasing devices bias said seal body outward in said radial direction.

4. A seal structure of a rotary machine according to claim 2, wherein:
said second biasing devices bias said seal body outward in said radial direction.

5. A gas turbine that uses the seal structure of a rotary machine according to claim 1.

* * * * *